(12) United States Patent
Chen et al.

(10) Patent No.: US 7,802,533 B1
(45) Date of Patent: Sep. 28, 2010

(54) MARINE VEHICLE HAVING PRE-SWIRL GENERATOR FOR GENERATING PRE-SWIRL FLOW

(75) Inventors: Po Fan Chen, Kaohsiung (TW); Chin Yi Lee, Kaohsiung (TW); Kun Tsung Tsai, Fongshan (TW); Kuo Cheng Tseng, Pingtung (TW)

(73) Assignee: CSBC Corporation, Taiwan, Kaohsiung (TW)

( * ) Notice: Subject to any disclaimer, the term of this patent is extended or adjusted under 35 U.S.C. 154(b) by 43 days.

(21) Appl. No.: 12/420,831

(22) Filed: Apr. 9, 2009

(51) Int. Cl.
*B63B 1/00* (2006.01)
(52) U.S. Cl. ...................................................... 114/271
(58) Field of Classification Search ................. 114/271, 114/284, 285
See application file for complete search history.

(56) References Cited

U.S. PATENT DOCUMENTS 6,244,817 B1 * 6/2001 Ngo ............................ 415/119

2006/0151631 A1 * 7/2006 Redding ...................... 239/383

* cited by examiner

*Primary Examiner*—Lars A Olson
(74) *Attorney, Agent, or Firm*—Brinks Hofer Gilson & Lione

(57) ABSTRACT

A marine vehicle includes a hull, a rudder, a propeller, a swirl generator mounting region provided on an outer surface of the hull and located on a port side or a starboard side where a rotation direction of the propeller is downward, and a pre-swirl generator having a swirl creating wedge disposed in the swirl generator mounting region. The swirl generator mounting region is disposed in front of a central axis of the rudder and behind a vertical line spaced from the central axis by a distance that is 0.2 times the length of the vehicle. The swirl creating wedge is inclined with respect to a waterline by an angle ($\theta 1$) of 13°-45°. The pre-swirl generator can produce a flow guiding effect that enhances propulsive efficiency of the marine vehicle.

4 Claims, 6 Drawing Sheets

MARINE VEHICLE HAVING PRE-SWIRL GENERATOR FOR GENERATING PRE-SWIRL FLOW

BACKGROUND OF THE INVENTION

1. Field of the Invention

The present invention relates to a marine vehicle, more particularly to a marine vehicle having a pre-swirl generator capable of generating pre-swirl flow to improve propulsive efficiency of the marine vehicle.

2. Description of the Related Art

Referring to FIG. 1, an existing marine vehicle 1 comprises a hull 11, and a propeller 12 that is mounted on the hull 11 and disposed under waterline 10. When the propeller 12 rotates, propeller blades thereof produce a propulsive force that drives the marine vehicle 1 to move forward or rearward.

Due to the working mechanism of the propeller, the propeller 12 produces a large amount of turbulence and dissipation loss while generating the propulsive force, thus reducing the effective propulsive force of the propeller 12. If the rotational speed of the propeller 12 is increased to improve propulsion, more turbulence and dissipation loss will result, thereby failing to enhance propulsion and advanced speed of the marine vehicle 1.

Referring to FIG. 2, in order to improve propulsion of the propeller 12, Taiwanese Patent Publication No. 200503920 discloses a flow guiding shroud 13 provided around the propeller 12 so that dissipation energy is gathered and converted into propulsive energy, thus improving the propulsion of the propeller 12. However, the flow guiding shroud 13 that covers the propeller 12 increases resistance to the rotation of the propeller 12, and the resistance tends to cancel or even exceed the propulsive energy enhanced by the flow guiding shroud so that the required propulsive horsepower may increase rather than decrease. Moreover, the flow guiding shroud 13 is not suitable for a large-sized marine vehicle since the cost thereof is high.

On the other hand, in order to reduce vibration of a marine vehicle, one of the countermeasure is to fit a pair of triangular hydrofoils on a port quarter and a starboard quarter of the marine vehicle to change an aft flow field and to reduce an exciting force of the propeller 12 behind the non-uniform distributed stern wake conditions. However, based on experiments conducted by the Hamburg Ship Model Basin (HSVA), such an arrangement can consume up to 2%-6% of propulsive horsepower for the marine vehicle.

SUMMARY OF THE INVENTION

Therefore, the object of the present invention is to provide a marine vehicle having a pre-swirl generator for generating a pre-swirl flow to improve propulsive efficiency of the marine vehicle.

Accordingly, the marine vehicle of the present invention comprises: a hull having a waterline, a port side, and a starboard side; a rudder extending downwardly from an aft of the hull and having a substantially vertical central axis; a propeller that is mounted on the hull in proximity to the rudder and that defines a rotating face when rotated, the rotating face having a topmost end; a swirl generator mounting region provided on an outer surface of the hull, the swirl generator mounting region being located on one of the port side and the starboard side where a rotation direction of the propeller is downward, the swirl generator mounting region being disposed in front of the central axis and behind a vertical line that is perpendicular to the waterline and that is spaced from the central axis of the rudder by a distance that is 0.2 times a length of the marine vehicle, the swirl generator mounting region being lower than a line that is substantially perpendicular to the vertical line and that extends at a level as high as the topmost end of the rotating face of the propeller; and a pre-swirl generator having a swirl creating wedge disposed in the swirl generator mounting region and inclined with respect to the waterline by an angle of 13°-45°.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
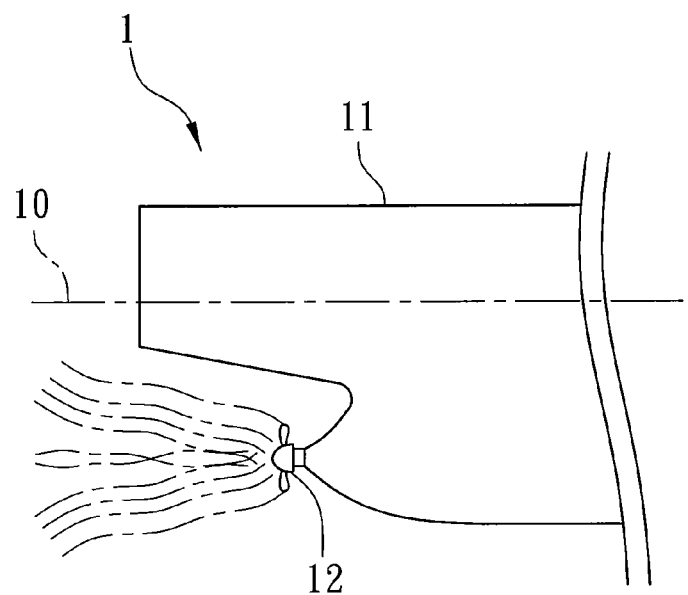
FIG. 1 is a side view of an aft of a marine vehicle.
Figure 2:
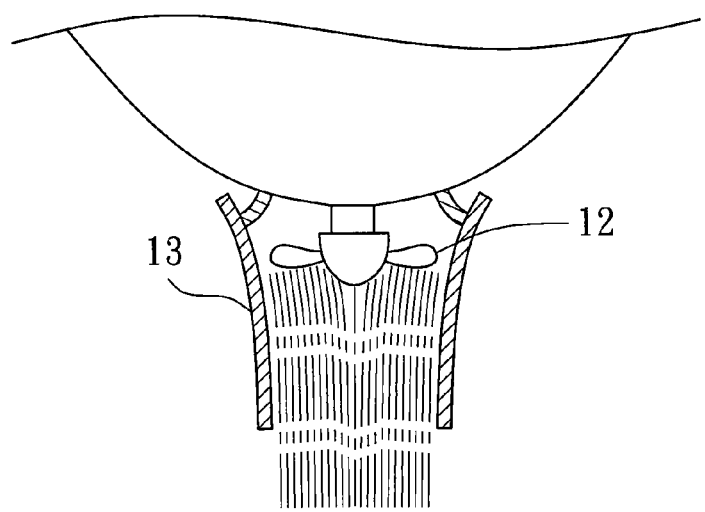
FIG. 2 is a cross-sectional view of a flow guiding shroud disclosed in Taiwanese Patent Publication No. 200503920.

Before the present invention is described in greater detail, it should be noted that like reference numerals are used to indicate corresponding or analogous elements throughout the accompanying disclosure.

Figure 3:
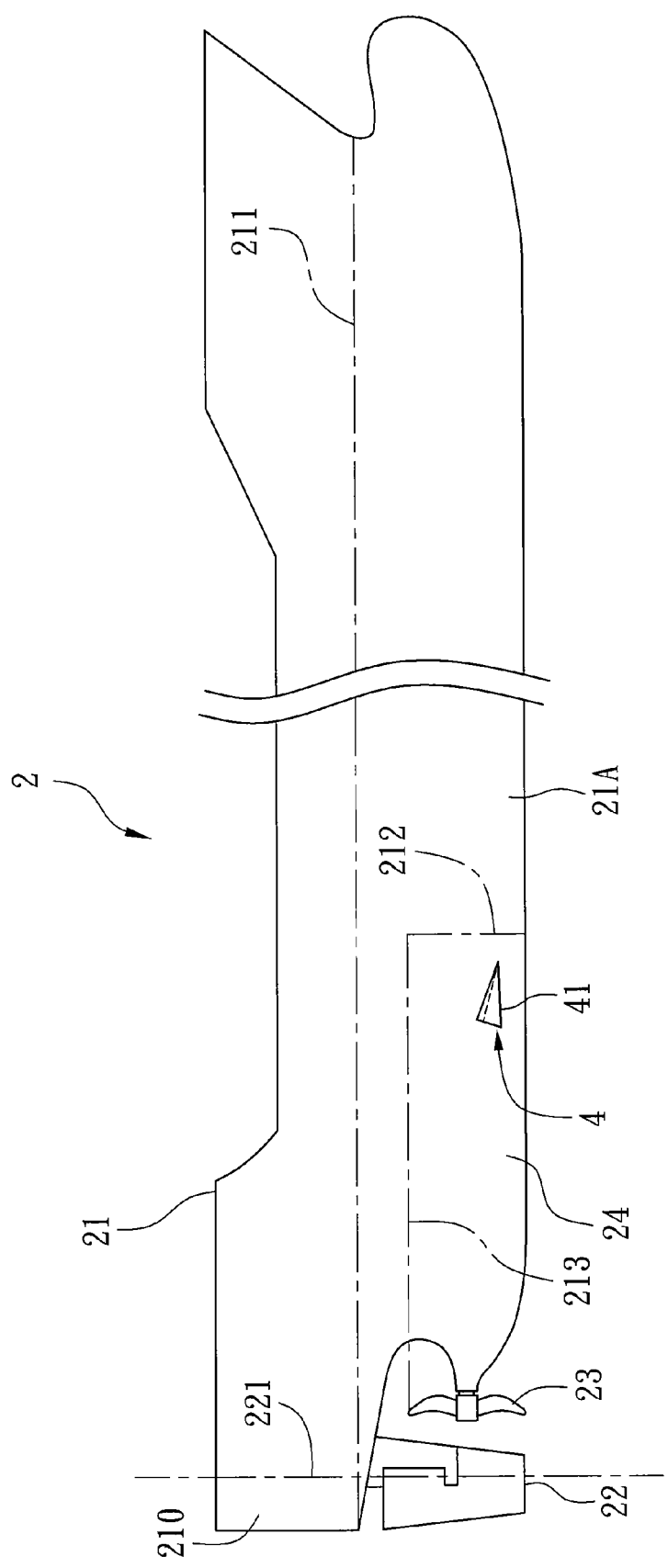
FIG. 3 is a side view of the first preferred embodiment of a marine vehicle having a pre-swirl generator according to the present invention.
Figure 4:
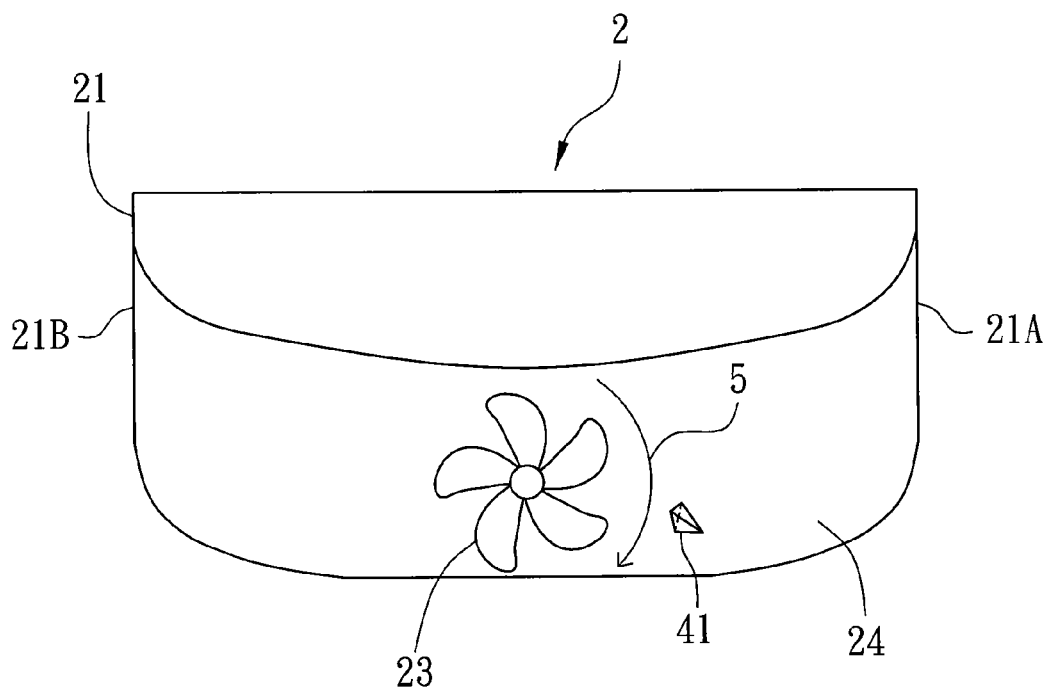
FIG. 4 is an elevational view of the first preferred embodiment.
Figure 5:
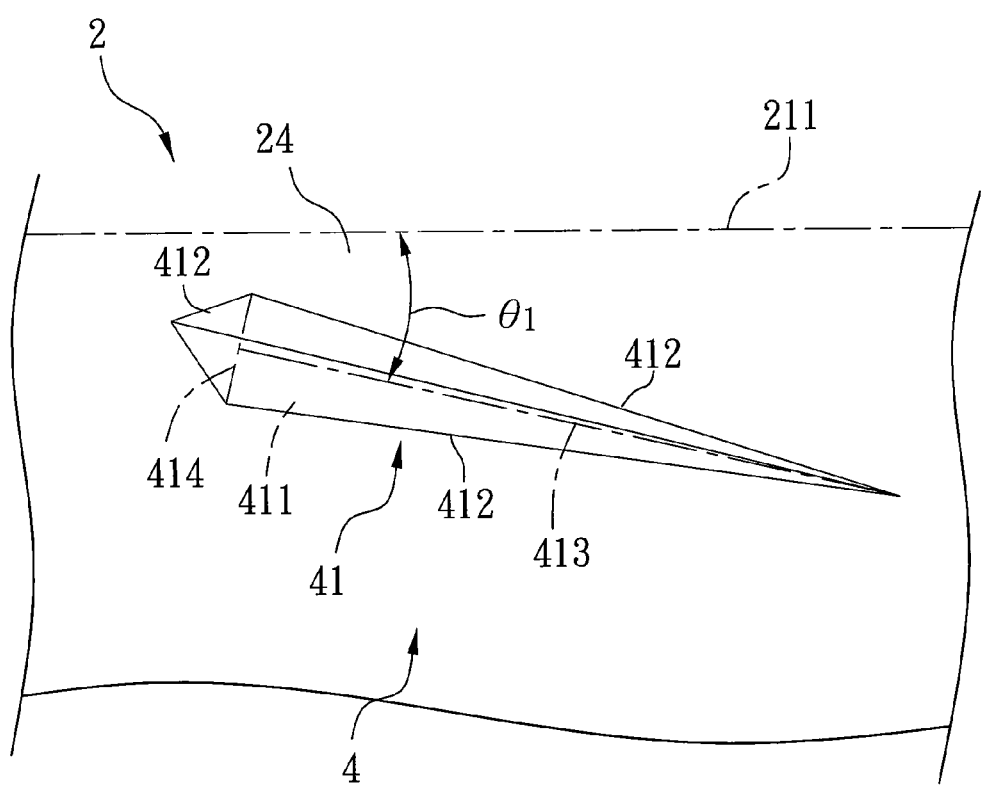
FIG. 5 is a fragmentary enlarged side view of the first preferred embodiment to illustrate a first swirl-creating wedge thereof.

Referring to FIGS. 3, 4 and 5, a marine vehicle 2 according to the first preferred embodiment of the present invention includes a hull 21, a rudder 22, a propeller 23, and a pre-swirl generator 4.

The hull 21 has a waterline 211, a starboard side 21A, and a port side 21B.

The rudder 22 extends downwardly from an aft 210 of the hull 21 and has a substantially vertical central axis 221.

The propeller 23 is mounted on the hull 21 in proximity to the rudder 22 and defines a rotating face when rotated.

A first swirl generator mounting region 24 is provided on an outer surface of the hull 21 on one of the starboard side 21A and the port side 21B, and is located on one of the starboard side 21A and the port side 21B where a rotation direction of the propeller 23 is downward. In this embodiment, the rotation direction 5 of the propeller 23 is downward at the starboard side 21A as shown in FIG. 4. Besides, the first swirl generator mounting region 24 is disposed in front of the central axis 221 of the rudder 22 and behind a vertical line 212 on the hull 21 that is perpendicular to the waterline 211 and that is spaced from the central axis 221 of the rudder 22 by a distance that is 0.2 times a length of the marine vehicle 2. Further, the first swirl generator mounting region 24 is lower than a line 213 that is substantially perpendicular to the vertical line 212 and that extends at a level as high as a topmost end of the rotating face of the propeller 23. Therefore, the first swirl generator mounting region 24 is disposed between the line 213 and a bottom end of the marine vehicle 2 and between the vertical line 212 and the central axis 221.

The pre-swirl generator 4 has a first swirl creating wedge 41 disposed in the first swirl generator mounting region 24. Referring to FIG. 5, the first swirl creating wedge 41 has a shape of a triangular pyramid, and includes a triangular face 411 in contact with the outer surface of the hull 21, and three projecting triangular faces 412 projecting from the outer surface of the hull 21 and extending respectively from three sides of the triangular face 411. The triangular face 411 has a height 413 that is 0.6%-1.8% of the length of the marine vehicle 2 and a base (the largest width) 414 that is 6%-25% of the height 413 of the triangular face 411. A line that defines the height 413 of the triangular face 411 is inclined with the waterline 211 by an angle ($\theta_1$) that ranges from 13°-45°. A largest height of the first swirl creating wedge 41 from the outer surface of the hull 21 is about 0.3%-2.0% of the length of the marine vehicle 2.

The resulting effects of the first preferred embodiment were verified by the applicant through a computational fluid dynamics simulation test and using a 1,700 TEU container vehicle owned by CSBC Corporation, Taiwan. The length of the vehicle is 164.9 m, the width of the vehicle is 27.9 m, the depth of the vehicle is 13.8 m, and the maximum draft of the vehicle is 9.5 m. The rotation direction of the propeller of the 1,700 TEU container vehicle is downward as shown by arrow 5 in FIG. 4, so that the first swirl creating wedge 41 is disposed in the first swirl generator mounting region 24 provided on the starboard side 21A as shown in FIG. 3. The height 413 of the triangular face 411 of the first swirl creating wedge 41 is 2.82 m, the base (the largest width) 414 of the triangular face 411 is 0.45 m, the largest height of the first swirl creating wedge 41 from the outer surface of the hull 21 is 0.68 m, and the angle $\theta_1$ defined between the line that defines the height 413 of the triangular face 411 and the waterline 211 is 15.4°. The test results are shown below in Table 1. In Table 1, the control group does not have the pre-swirl generator 4. Example 1 is directed to one having the first swirl creating wedge 41 of the pre-swirl generator 4 disposed in the first swirl generator mounting region 24 on the starboard side 21A of the container vehicle.

15.4°, the metric horsepower needed for propulsion is reduced by 80 PS, and the reduction rate of required horsepower is 0.37%.

Figure 9:
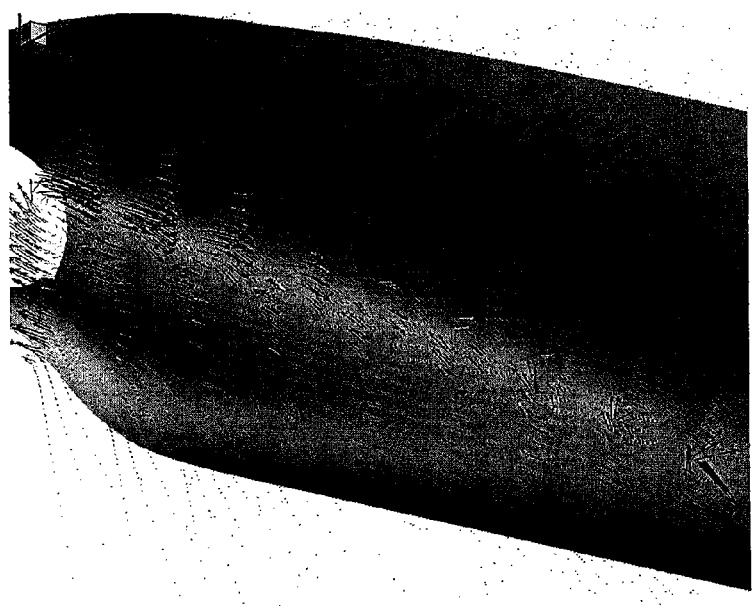
FIGS. 9 and 10 illustrate an induced flow guiding effect attributed to the first swirl creating wedge of the marine vehicle of this invention.
Figure 10:
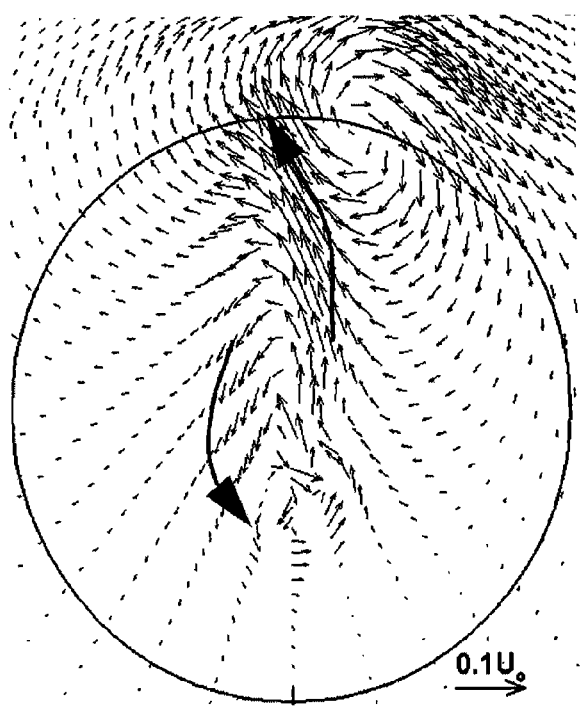

Referring to FIGS. 9 and 10 in combination with FIGS. 4 and 5, the first swirl creating wedge 41, which is disposed in the first swirl generator mounting region 24 where the rotation direction 5 of the propeller 23 is downward, and which is inclined with respect to the waterline 211 by the angle $\theta_1$, can produce an induced flow guiding effect. The guided flow can be a pre-swirl flow flowing into the propeller 23 of the marine vehicle 2. Due to the pre-swirl flow, the required propulsive power of the marine vehicle 2 can be reduced, and the propulsive efficiency of marine vehicle 2 can be improved.

Additional tests were conducted for different values of the angle $\theta_1$ between the first swirl creating wedge 41 and the waterline 211 to examine an angle value that can reduce the required propulsive power of the marine vehicle 2 and that can increase the propulsive efficiency. The test results are shown in Table 2.

TABLE 2

| Vehicle model | length × width × depth × maximum draft (m) | First angle $\theta_1$ |
|---|---|---|
| 1,700TEU | 164.9 × 27.9 × 13.8 × 9.5 | 15.4° |
| 3,200TEU | 232.4 × 32.2 × 19.5 × 11.0 | 30.0° |
| 2,200TEU | 187.1 × 30.2 × 17.5 × 11.0 | 29.8° |
| 1,100TEU | 145.0 × 25.0 × 13.9 × 9.5 | 42.9° |

In the tests, the rotation direction of the propeller 23 is downward as shown by arrow 5 in FIG. 4, and thus the first swirl creating wedge 41 is disposed in the first swirl generator mounting region 24 on the starboard side 21A of the marine vehicle 2 as shown in FIG. 4. Of course, if the rotation direction of the propeller 23 is opposite to that shown in FIG. 4, the first swirl creating wedge 41 should be disposed on the port side 21B of the marine vehicle 2.

Figure 6:
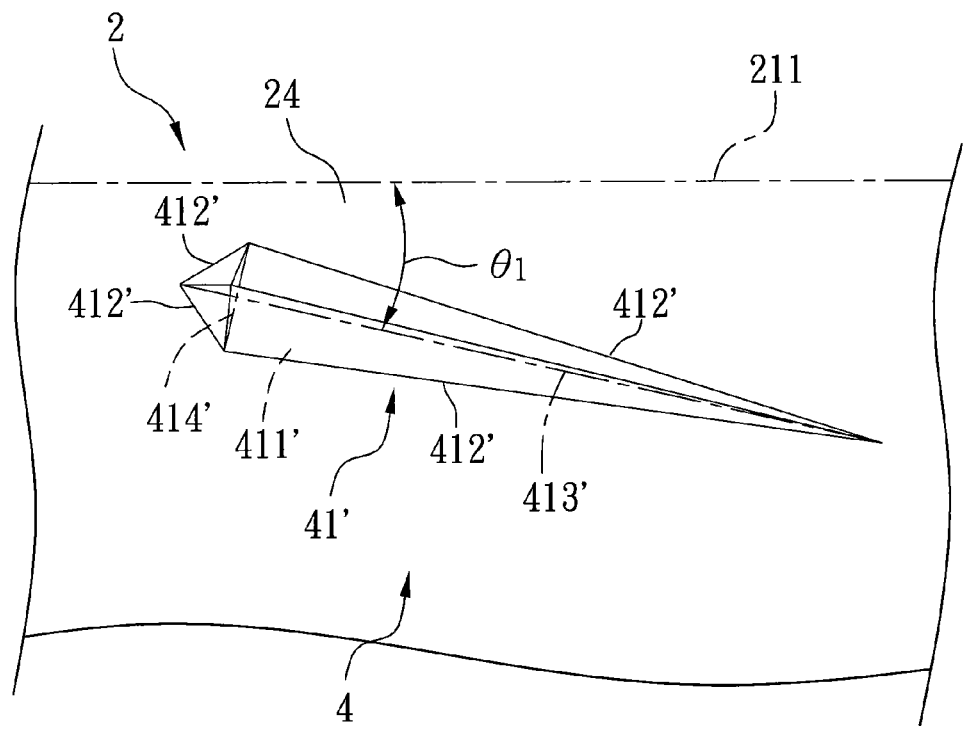
FIG. 6 is a fragmentary enlarged side view to illustrate a modified first swirl-creating wedge of the first preferred embodiment.

Referring to FIG. 6, there is shown a modification of the pre-swirl generator 4 which differs from that shown in FIG. 5 in that the first swirl creating wedge 41' shown in FIG. 6 has a shape of a rhombic pyramid and includes a rhombic face 411' in contact with the outer surface of the hull 21, and four projecting triangular faces 412' projecting from the outer surface of the hull 21 and extending respectively from four sides of the rhombic face 411'. The rhombic face 411' has a long diagonal line 413' that is 0.8%-2.2% of the length of the marine vehicle 2, and a short diagonal line 414' that is

TABLE 1

| | Total coefficient of resistance | 1-ω | 1-t | Self-propulsive efficiency | Hull-propulsive efficiency | Propulsive efficiency | Reduction rate of Required horsepower (PS) (%) | Horsepower reduction (PS) |
|---|---|---|---|---|---|---|---|---|
| Control group | 1.0000 | 0.7780 | 0.8006 | 0.6897 | 1.029 | 0.7097 | 0.00 | 0 |
| | | | | $\theta_1 = 15.4°$ | | | | |
| Ex. 1 | 1.0000 | 0.7779 | 0.8004 | 0.6923 | 1.029 | 0.7124 | 0.37 | 80 |

It is shown in Table 1 that, when the first swirl creating wedge 41 is disposed in the first swirl generator mounting region 24 on the starboard side 21A of the 1,700 TEU container vehicle as shown in FIG. 3, and when the angle $\theta_1$ is orthogonal to the long diagonal line 413' and that is 4%-20% of the long diagonal line 413'. A line that defines the long diagonal line 413' of the rhombic face 411' is inclined with the waterline 211 to form the angle $\theta_1$. A largest height of the first swirl creating wedge 41' from the outer surface of the hull 21 is 0.3%-2.0% of the length of the marine vehicle 2. The first swirl creating wedge 41' can provide the same advantages of reducing the required propulsive power for the marine vehicle 2 and improving the propulsive efficiency.

Figure 7:
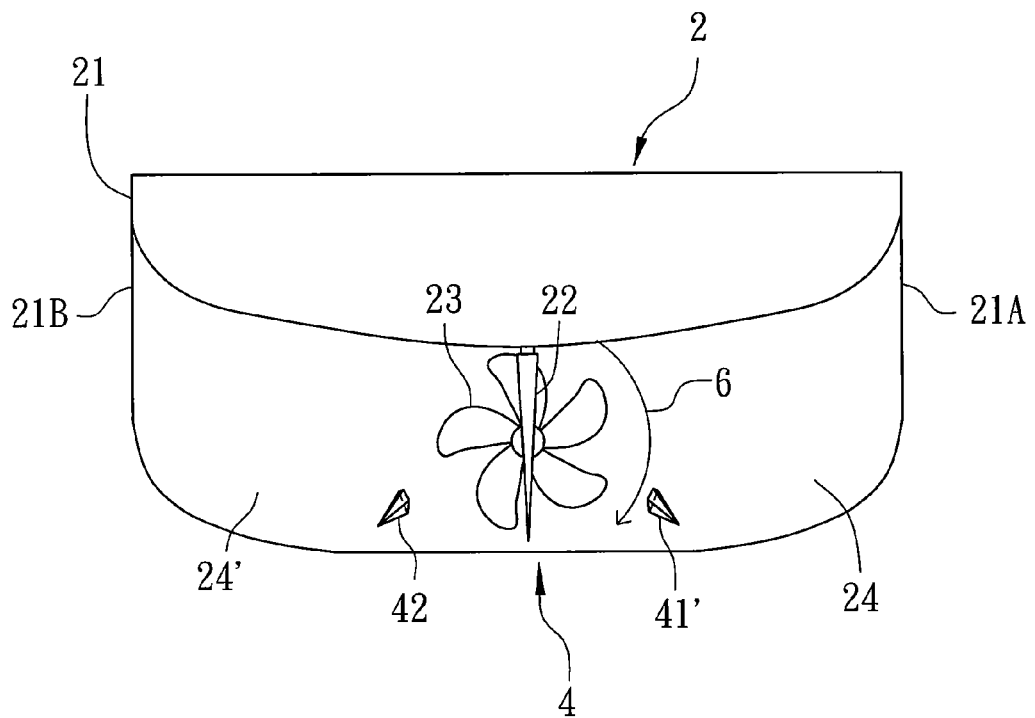
FIG. 7 is an elevational view of the second preferred embodiment of a marine vehicle according to the present invention.
Figure 8:
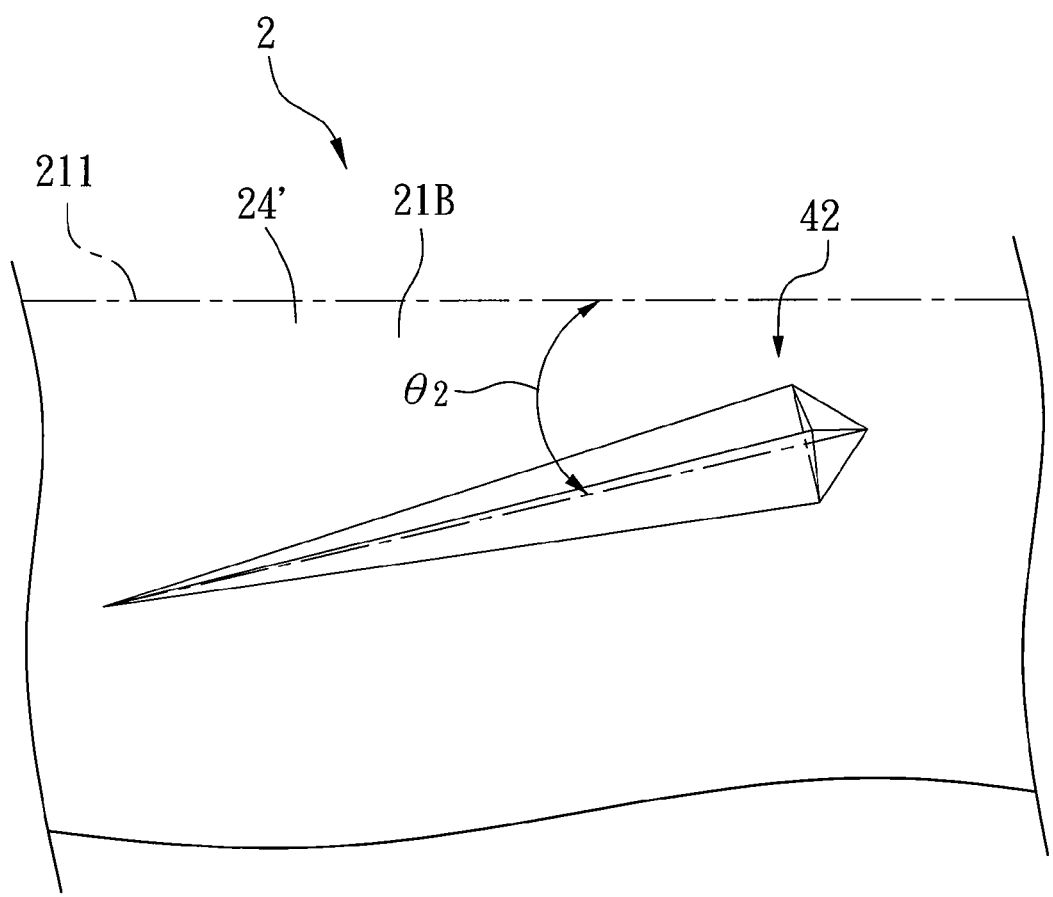
FIG. 8 is a fragmentary enlarged side view of the second preferred embodiment to illustrate a second swirl-creating wedge thereof.

Referring to FIGS. 7 and 8, the second preferred embodiment of the present invention has a structure generally similar to that of the first preferred embodiment. The main difference between this embodiment and the previous embodiment resides in that the marine vehicle 2 in this embodiment further includes a second swirl generator mounting region 24' on the port side 21B, in addition to the first swirl generator mounting region 24 on the starboard side 21A. Thus, the first and second swirl generator mounting regions 24, 24' are disposed respectively on the starboard side 21A and the port side 21B. Besides, the pre-swirl generator 4 in this embodiment further has a second swirl creating wedge 42 corresponding to the first swirl creating wedge 41' and disposed in the second swirl generator mounting region 24' on the port side 21B. The second swirl creating wedge 42 is inclined with respect to the waterline 211 by an angle $\theta_2$.

An additional computational fluid dynamics simulation test was conducted using the 1,700 TEU container vehicle of CSBC (Taiwan) to examine the effect of the second embodiment of the invention. Referring to FIGS. 6 and 8, in the test, the long diagonal lines 413' of rhombic pyramid type first and second swirl creating wedges 41', 42 are 1.88 m, the short diagonal lines 414' thereof are 0.24 m, the largest heights of the first and second swirl creating wedges 41', 42 from the outer surface of the hull 21 are 0.68 m, and the angles $\theta_1$, $\theta_2$ thereof are both 13.0°. The test results are shown below in Table 3. The control group in Table 3 does not have the pre-swirl generator 4, and example 2 has the first and second swirl generators 41', 42 on the starboard side 21A and the port side 21B, respectively.

TABLE 3

| | Total coefficient of resistance | 1-ω | 1-t | Self-propulsive efficiency | Hull-propulsive efficiency | Propulsive efficiency | Reduction rate of required horsepower (PS) (%) | Horsepower reduction (PS) |
|---|---|---|---|---|---|---|---|---|
| Control group | 1.0000 | 0.7780 | 0.8006 | 0.6897 | 1.029 | 0.7097 | 0.00 | 0 |
| | | | | $\theta_1 = \theta_2 = 13°$ | | | | |
| Ex. 2 | 1.0067 | 0.7722 | 0.8052 | 0.6870 | 1.0426 | 0.7165 | 0.27 | 58 |

It is shown in Table 3 that the second preferred embodiment can reduce the required propulsive horsepower by 58 PS, and the reduction rate of required horsepower is 0.27%. Therefore, the effects of reducing the required propulsive power as well as improving the propulsive efficiency can be similarly achieved in the second preferred embodiment.

Alternatively, the first and second swirl-creating wedges 41', 42 which have the shape of a rhombic pyramid in the second preferred embodiment may be replaced by the triangular pyramid of FIG. 5 having the dimensions falling within the ranges mentioned hereinabove.

It should be noted that the computational fluid dynamics simulation test was scaled to 1/23.76 for the 1,700 TEU container vehicle. Due to the scaling effect, the percentage of the viscous resistance of the pre-swirl generator 4 based on a total resistance is reduced compared to that in actual scale of real ship, such that the power loss due to the pre-swirl generator 4 is substantially reduced. It is presumed that in actual practice the reduction rate of PS is approximately 1-2%.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A marine vehicle, comprising:

a hull having a waterline, a port side, and a starboard side;

a rudder extending downwardly from an aft of said hull and having a substantially vertical central axis;

a propeller that is mounted on said hull in proximity to said rudder and that defines a rotating face when rotated, said rotating face having a topmost end;

a first swirl generator mounting region provided on an outer surface of said hull, said first swirl generator mounting region being located on one of said port side and said starboard side where a rotation direction of said propeller is downward, said first swirl generator mounting region being disposed in front of said central axis and behind a vertical line that is perpendicular to said waterline and that is spaced from said central axis of said rudder by a distance that is 0.2 times a length of said marine vehicle, said first swirl generator mounting region being lower than a line that is substantially perpendicular to said vertical line and that extends at a level as high as said topmost end of said rotating face of said propeller; and a pre-swirl generator having a first swirl creating wedge disposed in said swirl generator mounting region and inclined with respect to said waterline by an angle ($\theta_1$) of 13°-45°.

2. The marine vehicle of claim 1, wherein said first swirl creating wedge has a shape of a triangular pyramid, and includes a triangular face in contact with said outer surface of said hull, and three projecting faces projecting from said outer surface and extending respectively from three sides of said triangular face, said triangular face having a height that is 0.6%-1.8% of said length of said marine vehicle and a base that is 6%-25% of said height of said triangular face, a line that defines said height of said triangular face being inclined with said waterline to form said angle ($\theta_1$), a largest height of said first swirl creating wedge from said outer surface of said hull being 0.3%-2.0% of said height of said length of said marine vehicle.

3. The marine vehicle of claim 1, wherein said first swirl creating wedge has a shape of a rhombic pyramid and includes a rhombic face in contact with said outer surface of said hull, and four projecting faces projecting from said outer surface and extending respectively from four sides of said rhombic face, said rhombic face having a long diagonal line that is 0.8%-2.2% of said length of said marine vehicle, and a short diagonal line that is 4%-20% of said long diagonal line of said rhombic face, a line that defines said long diagonal line of said rhombic face being inclined with said waterline to form said angle ($\theta_1$), a largest height of said first swirl creating wedge from said outer surface of said hull being 0.3%-2.0% of said length of said marine vehicle.

4. The marine vehicle of claim 3, further comprising a second swirl generator mounting region, said first and second swirl generator mounting regions being disposed respectively on said starboard side and said port side, said pre-swirl generator further having a second swirl creating wedge corresponding to said first swirl creating wedge and being disposed in said second swirl generator mounting region.

* * * * *